March 11, 1952     A. A. NICHOLS     2,588,653
FLOATING DRIVE CONNECTION FOR METERING PUMPS
Filed Sept. 17, 1947
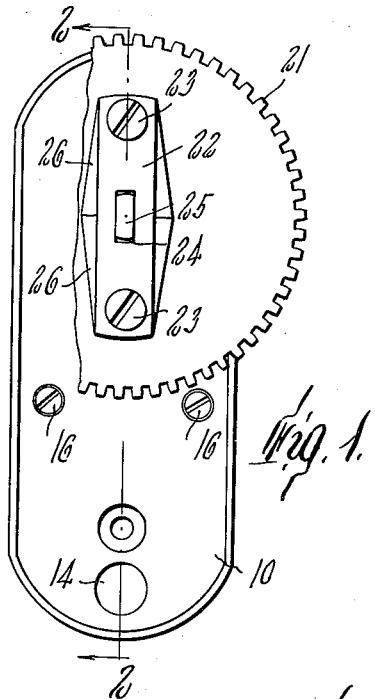
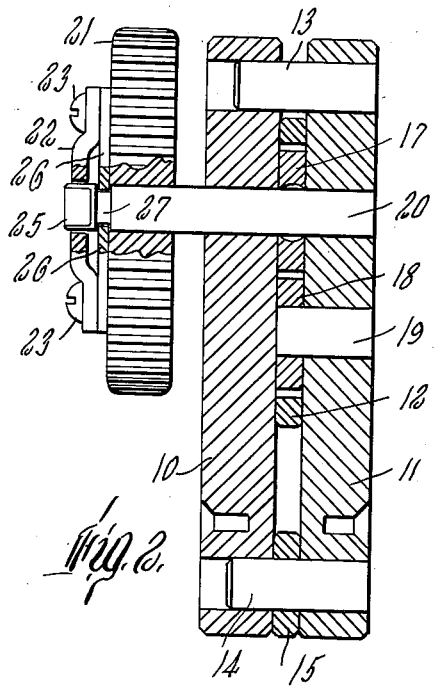
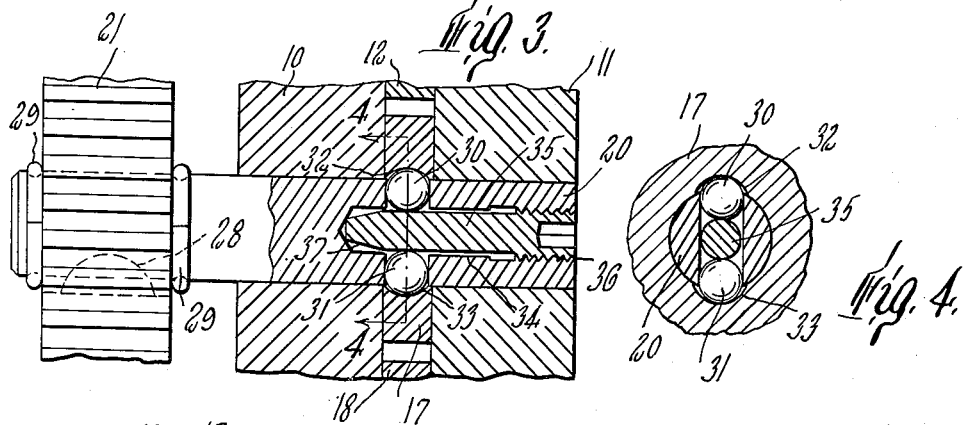
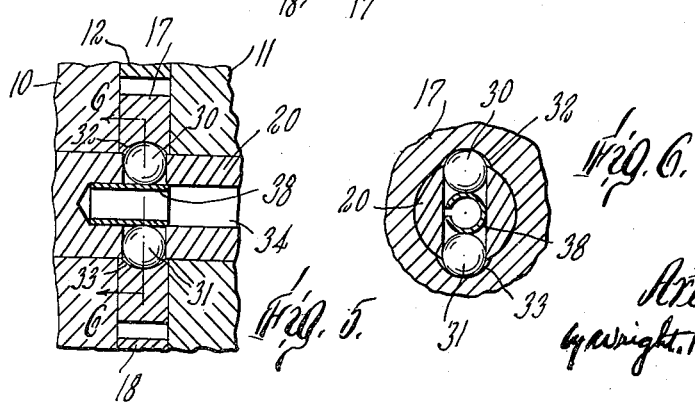
Inventor
Arthur A. Nichols
by Wright, Brown, Quinby & Huey
Attys.

Patented Mar. 11, 1952

2,588,653

UNITED STATES PATENT OFFICE 2,588,653

FLOATING DRIVE CONNECTION FOR METERING PUMPS

Arthur A. Nichols, Weston, Mass., assignor to W. H. Nichols Company, Waltham, Mass., a corporation of Massachusetts Application September 17, 1947, Serial No. 774,599

3 Claims. (Cl. 103—126)

The present invention relates to gear pumps and has special reference to pumps of that type which are designed and adapted for propelling and metering liquid viscose or other fluid compound to be extruded through spinning jets for the formation of artificial silk filaments and the like. Its object is to improve and simplify the means by which driving torque is applied to one of the intermeshing gears of the pump whereby to obviate objectionable features of the driving connections heretofore used while maintaining undiminished all the desirable characteristics of such pumps and increasing the average length of service which the pumps can render without attention.

The metering pumps previously used in this art have generally been provided with an external hub on the pump casing supporting a driving gear to which power is applied from an external source and such driving gear was connected by a coupling with a shaft on which one of the pump gears was rigidly secured. With such pumps difficulty is encountered in lubricating the external gear and its shaft or coupling member and preventing either entrance of the lubricant used for that purpose into the pump casing or seepage of the viscose solution from the pump into the bearings of the drive gear and it shaft or coupler. One of the major costs in rayon plants wherein pumps of the type here described are used, is the cost of repairing, maintaining and lubricating the external driving units.

In accordance with the present invention the external hub is eliminated, the external driving gear is mounted directly on the shaft to which one of the pump gears is coupled, and a novel floating coupling is provided between such shaft and the associated pump gear which relieves the gear from all lateral stresses while transmitting rotation in exact equality with the rotation of the driving gear.

The accompanying drawings illustrate the principles of the invention with reference to the presently preferred embodiment thereof and equivalent variations of certain of its features. In these drawings:

Fig. 1 is a front elevation of a metering gear pump embodying this invention;

Fig. 2 is a sectional view taken on line 2—2 of Fig. 1;

Fig. 3 is a sectional view on a larger scale showing the details of the presently preferred form of coupling means between the driving shaft and the pump gear driven thereby, and showing also a frangible means for connecting the driving gear with such shaft alternative to the connecting means shown in the preceding figures;

Fig. 4 is a detail cross section taken on line 4—4 of Fig. 3;

Fig. 5 is a fragmentary sectional view showing a variation in coupling means between the shaft and pump gear from that illustrated in Figs. 3 and 4;

Fig. 6 is a detail section on line 6—6 of Fig. 5.

Like reference characters designate the same parts wherever they occur in all the figures.

The pump here illustrated is substantially like metering gear pumps heretofore used in large numbers except for the means of connecting the external driving gear with the interior metering gears. The casing is composed of two massive side plates 10 and 11, a center plate 12, dowels 13 and 14 by which the side plates are held in correct alinement, a spacer disk or washer 15 surrounding the dowel 14, and binder screws 16, 16 by which the side plates 10 and 11 are clamped in tight engagement with the opposite side faces of the center plate 12. In the middle part of the center plate merging cylindrical chambers are provided in which pump gears 17 and 18 are fitted rotatably and in mesh with one another. A stud 19 is mounted in the side plate 11 projecting through the chamber in the center plate wherein gear 18 is contained, centrally thereof, and provides the centering bearing for that gear. A drive shaft 20 is fitted rotatably in aligned bearings in the side plates 10 and 11 coaxial with the chamber wherein the gear 17 is contained, and protrudes at one end from the side plate 10. A driving gear 21 or equivalent machine element is mounted on the protruding end of shaft 20 and is adapted to transmit rotation to the shaft from a power source, such as a gear or sprocket on a countershaft. The driving gear is coupled with shaft 20 by means which, in case of stoppage of the metering gears, will give way or fail before the metering gears are injured.

One form of frangible coupling is illustrated in Figs. 1 and 2. This consists of a strap 22 secured to the outer face of the gear by screws 23 in a diametral position. In its mid length it is provided with a slot 24 into which the flattened end portion 25 of shaft 20 projects. This strap is made of metal with such proportions and of such a quality of brittleness that it will break at some points between its outer sides and the bounding walls of slot 24, in case the metering gears should be obstructed by anything which might damage the gears or mar the contiguous surfaces of the gears and casing otherwise. Except for the coupling strap, the driving gear is free to rotate on shaft 20. It is prevented from slipping endwise off the shaft, when in operation, by yoke pieces 26 which are clamped to the gear by the screws 23 and end portions of strap 22 and project into a groove 27 which surrounds the shaft adjacent to its outer end.

An alternative frangible coupling is shown in Fig. 3 in the form of a key 28 of such low shear strength that it will fail before injury is caused to the inner parts of the pump by obstructing matter. The driving gear 21 in this arrangement is retained from endwise displacement on the shaft by snap rings 29 occupying surrounding grooves in the shaft at opposite ends of the hub portion of the gear.

The main novel feature of the invention resides in a floating coupling between the drive shaft 20 and the metering gear 17 which is centered on that shaft. In the embodiments here shown, this coupling means comprises two balls 30 and 31 contained in radial passages in the shaft and projecting into spherically curved pockets 32 and 33 in the bore of the gear. The pockets are cut to a suitable depth to afford sufficient keying capacity, but preferably less than the radius of the balls, and the radius of their spherical surfaces is slightly larger than the radius of the balls. Also the bore of the gear 17 is slightly larger than the diameter of the shaft. The radial passages containing the balls 30 and 31 intersect a central passage 34 which extends inwardly into the shaft from the end opposite to that on which the driving gear is mounted. An expanding pin 35 is mounted detachably in the passage 34 by means of screw threads 36 at its outer end and it extends inwardly beyond the balls when fully inserted. Its inner end 37 is tapered sufficiently to spread the balls apart when passed inward between them, and the pin is formed adjacent to the tapered end with a cylindrical zone of a diameter sufficient to hold the balls in keyed relation with the gear. This is the relationship of Figs. 3 and 4.

By way of illustration, but not limitation, I may say that in one design of the invention which I have made, the diameters of the cylindrical part of the pin and of the balls, and the depth of the pockets, are established with tolerance limits such that the clearance between the balls and the bottoms of the pockets is between zero and .006". This expander pin can be screwed in and out by a screw driver or plug type wrench.

The number of balls and pockets is not a limiting factor. Preferably there are at least two of them in diametrically opposite locations in order to afford balanced driving conditions. But there may be more than two, preferably distributed equiangularly around the axis. It is practically desirable also that they be so located with respect to the opposite end faces of the gear and the pockets be of such limited depth that the rims of the pockets are at all points thereof spaced inward from the side faces of the gear.

Alternative means for holding the balls in their keying position is shown in Figs. 5 and 6, consisting of a split spring sleeve or bushing 38 confined within the longitudinal passage of the shaft and retained by spring friction in the zone where the balls are located. This expander is generally equivalent to the expanding pin 35, but is less desirable from the practical standpoints of durability and ease of insertion and removal.

The floating coupling means here described has the following important features of utility.

(1) It enables the shaft to be deflected from a true normal relation to the plane of the gear without tending to tilt the gear, and allows the gear to bear evenly on the side plates.

(2) It simplifies the pump construction by reducing to the minimum the parts which are exposed to corrosive influences.

(3) It eliminates the grease fitting formerly required for effective running of the pump, thus reducing maintenance expense by omitting all lubrication other than that afforded automatically by the solution being pumped.

(4) It eliminates scoring between the metering gear and the side plates of the pump by allowing the gear to find its own plane of rotation unrestricted by whatever angular position the shaft may take in either a new or worn casting, particularly a worn one.

(5) The provision of perfectly flat sides to the metering gear eliminates one source of scoring in pumps employed with viscose.

(6) The plural point drive (through two or more equiangularly spaced balls) gives balanced driving conditions so that the gear does not tend to assume an eccentric position with respect to the shaft or to the chamber in which it is contained.

(7) There are no blind pockets in which viscose can collect and harden with the ultimate effect of scoring the side plates of the pump.

(8) Any tendency of the drive shaft to be shifted endwise by the power source is effectively resisted.

The general principles of the invention, so far as they relate to a floating coupling between a drive shaft and a pump rotor may be embodied in other combinations than those specifically shown.

What I claim is:

1. In a gear pump which has side walls with plane parallel opposed faces and with a transverse bore for a shaft, a gear closely fitted between said opposed faces, said gear having a plane parallel side faces and a central transverse bore, said gear also having spherically curved recesses in its bore spaced inward from said side faces, a shaft extending through said bore, said shaft having therein an axial passage extending in from an end thereof and radial passages intersecting said axial passage, a ball in each said radial passage, each said ball having a smaller rdius of curvature than said recesses, and an expander in said axial passage supporting said balls radially so that they protrude into said recesses.

2. Mechanism as in claim 1 in which the expander is a pin detachably secured in the axial passageway, having a cylindrical portion engaged with the inner sides of the balls holding them in projecting keyed engagement with the gear, and having a tapered inner end adapted to force the balls outward into protruding positions when the pin is passed inwardly along the axial passage.

3. Mechanism as in claim 1 in which the expander is a split spring sleeve contained in the axial passage of the shaft in the portion there which intersects the radial passages.

ARTHUR A. NICHOLS.

REFERENCES CITED

The following references are of record in the file of this patent:

UNITED STATES PATENTS

| Number | Name | Date |
|---|---|---|
| 851,728 | Bayrer | Apr. 30, 1907 |
| 1,244,848 | Gadke | Oct. 30, 1917 |
| 1,611,912 | Hleb | Dec. 28, 1926 |
| 1,629,121 | Russel et al. | May 17, 1927 |
| 1,640,727 | Scott | Aug. 30, 1927 |
| 1,771,349 | Puffer | July 22, 1930 |
| 1,937,502 | Anger | Dec. 5, 1933 |
| 2,049,797 | Bochmann et al. | Aug. 4, 1936 |
| 2,062,424 | Mueller | Dec. 1, 1936 |
| 2,266,499 | Leake | Dec. 16, 1941 |
| 2,442,254 | Whitfield | May. 25, 1948 |

FOREIGN PATENTS

| Number | Country | Date |
|---|---|---|
| 236,134 | Germany | July 1, 1911 |
| 487,293 | France | Mar. 29, 1918 |